US008015554B2

(12) United States Patent
Varma (10) Patent No.: US 8,015,554 B2
(45) Date of Patent: Sep. 6, 2011

(54) SOURCE-TO-SOURCE TRANSFORMATION FOR LANGUAGE DIALECTS

(75) Inventor: Pradeep Varma, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 1302 days.

(21) Appl. No.: 11/388,353

(22) Filed: Mar. 24, 2006

(65) Prior Publication Data

US 2007/0226708 A1    Sep. 27, 2007

(51) Int. Cl.
*G06F 9/44* (2006.01)
(52) U.S. Cl. .......................................... 717/137
(58) Field of Classification Search .................. None
See application file for complete search history.

(56) References Cited

U.S. PATENT DOCUMENTS

| | | | | |
|---|---|---|---|---|
| 4,374,408 A * | 2/1983 | Bowles et al. | ................. | 717/137 |
| 5,119,465 A * | 6/1992 | Jack et al. | ................... | 717/137 |
| 5,187,789 A * | 2/1993 | O'Hair | ................... | 1/1 |
| 5,671,416 A * | 9/1997 | Elson | ................... | 717/106 |
| 5,768,564 A * | 6/1998 | Andrews et al. | ................ | 717/137 |
| 5,836,014 A | 11/1998 | Faiman, Jr. | | |
| 6,317,871 B1 * | 11/2001 | Andrews et al. | ................ | 717/137 |
| 6,453,464 B1 * | 9/2002 | Sullivan | .................. | 717/137 |
| 6,501,486 B1 | 12/2002 | Lau | | |
| 6,516,461 B1 * | 2/2003 | Ichisugi | .................. | 717/144 |
| 6,662,356 B1 * | 12/2003 | Edwards et al. | ............... | 717/113 |
| 6,684,388 B1 * | 1/2004 | Gupta et al. | ................... | 717/136 |
| 6,785,880 B1 | 8/2004 | Beisiegel et al. | | |
| 6,802,056 B1 * | 10/2004 | Chaiken et al. | ............... | 717/136 |
| 6,907,599 B1 * | 6/2005 | Kashai et al. | ................. | 717/137 |
| 2004/0168160 A1 * | 8/2004 | Zatloukal | ..................... | 717/140 |
| 2004/0181783 A1 * | 9/2004 | Nagata et al. | ................. | 717/137 |
| 2004/0268331 A1 * | 12/2004 | Mitchell et al. | ............... | 717/146 |
| 2005/0010891 A1 * | 1/2005 | Chaiken et al. | ............... | 717/100 |
| 2005/0144598 A1 * | 6/2005 | Sabadell et al. | .............. | 717/137 |
| 2006/0031820 A1 * | 2/2006 | Li | ................................ | 717/137 |

(Continued)

OTHER PUBLICATIONS

Baxter, I. D., Pidgeon, C., and Mehlich, M. DMS: Program Transformations for Practical Scalable Software Evolution, In Proc. *IEEE/ACM Intl Conf. Software Engineering* (ICSE 2004) ACM Press, New York, NY, 2004. 625-634.

(Continued)

*Primary Examiner* — Michael J Yigdall
*Assistant Examiner* — Samuel Hayim
(74) *Attorney, Agent, or Firm* — Gibb I.P. Law Firm, LLC; Derek S. Jennings (57) ABSTRACT

An analysis and source-to-source transformation framework covers dialects of programming languages that lack formal definition for all individual dialects. Multiple instantiations of the same compiler front-end tools can be used with different settings to create distinct intermediate forms and maps. Intermediate forms and maps are used in an individual analysis and source-to-source transformation context, and performing the analysis and source-to-source transformation thereupon. A unified tool set is desirably provided, including standard compiler front-end tools and code transformation/generation tools, wherein source code edits are carried out in order to make the source code more amenable to translation to intermediate forms. The analysis results or intermediate forms created by individual tools are used by other tools as well as further analyzed to create a map of the regions of validity and invalidity of the intermediate forms, and tracking the source-code edits performed in order to obtain the same. Among other benefits, this provides a choice of the best tools combination for maximum code analysis coverage.

14 Claims, 5 Drawing Sheets

U.S. PATENT DOCUMENTS

2007/0011669 A1 * 1/2007 Varma et al. .................. 717/168

OTHER PUBLICATIONS

T. A. El-Ghazawi, W. W. Carlson, and J. M. Draper, "UPC Language Specifications V 1.0", Feb. 25, 2001. ftp://ftp.seas.gwu.edu/pub/upc/downloads/upc_specs.pdf.

Devanbu, P. T. Genoa—A Customizable, Front-End-Retargetable Source Code Analysis Framework. *ACM Trans. Soft. Eng. Method.*, vol. 8, No. 2, (Apr. 1999). 177-212.

Griswold, W. G., Yuan, J. J., and Kato, Y. Exploiting the Map Metaphor in a Tool for Software Evolution. In Proc. *IEEE/ACM Intl Conf. Software Engineering* (ICSE 2001) ACM Press, New York, NY, 2004. 265-274.

Kim, I-S., and Choe, K-M. Error Repair with Validation in LR-based Parsing. ACM Trans. Prog. Lang. Syst.,vol. 23, No. 4, (Jul. 2001), 451-471.

Mauney, J., and Fischer, C. N. Determining the Extent of Lookahead in Syntactic Error Repair. *ACM Trans. Prog. Lang. Syst.*, vol. 10, No. 3, (Jul. 1988), 456-469.

Murphy, G. C. Lightweight Lexical Source Model Extraction. ACM Trans. Soft. Eng. Method., vol. 5, No. 3, (Jul. 1996). 262-292.

Varma, P. Anand, A., Pazel, D. P., Tibbitts, B. R. "NextGen EXtreme Porting: Structured by Automation", In *Proc. ACM Symp. Applied Computing (SAC 2005)* (Santa Fe, NM, USA, Mar. '05) ACM Press, New York. 1511-1517.

Stratego, Visser, E., "*A language for program transformation based on rewriting strategies*" (Middledrop, A., editor), In Rewriting Techniques and Applications, 2001(RTA'01), Springer-Verlag Lecture Notes in Computer Science, vol. 2051, pp. 357-361.

C. Sun, X. Jia, Y. Zhang, Y. Yang, and D. Chen: "Achieving convergence, causality-preservation, and intention-preservation in realtime cooperative editing systems" ACM Transactions on Computer-Human Interaction, vol. 5,No. 1, Mar. 1998, pp. 63-108.

D. P. Pazel, P. Varma, A. Paradkar, B. Tibbitts, A. Anand, "A Framework and Tool for Porting Assessment and Remediation", In *Proceedings of the IEEE International Conference on Software Maintenance (ICSM'04)* (Chicago, Illinois, USA, Sep. 11-17, 2004).

\* cited by examiner

```
M-file      ::= [egroup]
egroup      ::= egroup-part+
egroup-part ::= text \n | if-esection | cont-
line | # token+ \n △* if-section  ::= if-egroup elif-egroup* [else-
egroup] endif-line
if-egroup   ::= # if const-expr \n △ [egroup] |
              # ifdef id \n △ [egroup] |
              # ifndef id \n △ [egroup]
elif-egroup ::= # elif const-expr \n △
              [egroup]
else-egroup ::= # else \n △ [egroup]
endif-line  ::= # endif \n △
text        ::= [[estring_invocation] token* △* ]*
cont-line   ::= ccont | mscont | attcont |
nstcont
ccont-line  ::= # include token+ \n △* |
              # define id replacement \n △* |
              # define id ( [id-list] )
              replacement \n △* |
              # undef id \n △ |
              # line token+ \n △* |
              # error token* \n △ |
              # pragma token* \n △* |
              # \n △
gnuC++cont  ::= # include_next token+ \n △* |
              # digits string kind+ \n △*
gnuCcont    ::= # include_next token+ \n △*
attcont     ::= # assert name [( token+ )] \n △* |
              # unassert name [( token+ )] \n △*
mscont      ::= # import "name.xxx" ... \n △* |
              # import <name.xxx> ... \n △*
c99varargmacro ::= # define id ( [id-list]
              , ... ) replacement \n △*
ident       ::= # ident string \n △
```

SOURCE-TO-SOURCE TRANSFORMATION FOR LANGUAGE DIALECTS

FIELD OF THE INVENTION

The present invention relates to source-to-source transformation of the source code of computer programming languages.

BACKGROUND

Source-to-source transformation techniques are used in compilers, for transforming computer source code written in computer programming languages, typically for program translation and optimization. Similar techniques are used in software maintenance activities (such as porting and migration). Various challenges arise, though, due to the myriad of language dialects and multiple/mixed language contexts that exist in large-scale "real-world" application codes.

Open languages, such as C and C++, present particular challenges due to the open nature of their standards. As a consequence of their open nature, vendors may (and do in many cases) provide divergent but standard-conformant behaviors for these open languages. Open languages may include specifications for particular behaviors, such as: "implementation-defined behavior", "unspecified behavior", "undefined behavior", and "locale-specific behavior". Such behaviors and related concepts are described in further detail in the C programming language standard that is published as ISO/IEC 9899: 1999 C standard (1999) and ISO/IEC 9899: 1999 C Technical Corrigendum (2001). These publications is available at http://www.iso.org.

The C++ programming language is a "superset" of the C programming language, and a C++ programming language standard is published as ISO/IEC 14882:1998 C++ standard (1998), and is also available at http://vww.iso.org. The premise of C++, as a "superset" of C, serves to exacerbate problems relating to porting C++ programs to a new computing environment. The evolution of C/C++ itself has given rise to a range of porting problems, such as "quiet changes". Such issues are described in further detail in a paper entitled "Rationale for International Standard Programming Languages—C Revision 5.10 April 2003". This paper represents the work of INCITS J11 and SC22 WG14, which are respectively the ANSI Technical Committee and ISO/IEC JTC 1 Working Group charged with revising the International Standard for the C programming language. This paper is available in electronic form from: http://www.open-std.org/jtc1/sc22/wg14/www/C99RationaleV5.10.pdf.

Earlier dialects (prior to standardization) of the C programming language (for example, Johnson pcc, Reiser cpp) have informal roots, which cast ambiguity over their definitions. Existing implementations of such early dialects are, in essence, the sole definers of these dialects.

The popularity of C/C++ has promoted experimentation, resulting in the development of non-conformant dialects for the C/C++ languages, such as Unified Parallel C (UPC). The specification for the UPC language is published as: T. A. El-Ghazawi, W. W. Carlson, and J. M. Draper, "UPC Language Specifications V 1.0", Feb. 25, 2001.

Large application codes, written in a mix of language dialects, present particular challenges for particular maintenance and porting activities, despite various existing approaches to the problems associated with multi-language/dialect coverage. These existing approaches may be characterized as formal in nature, and include the Stratego approach and the so-called DMS approach, both of which are briefly described below.

The Stratego language specifies program transformation by traversals over an abstract syntax tree (AST). The Stratego language is described in: Visser, E. Stratego, "*A language for program transformation based on rewriting strategies*" (A. Middledrop, editor), in Rewriting Techniques and Applications, 2001 (RTA '01), Springer-Verlag Lecture Notes in Computer Science Vol. 2051, 357-361.

A Stratego specification requires an explicit specification of an AST definition, as well as a traversal strategy. The combination of this explicit specification and the traversal strategy is then automatically converted into a source-to-source program transformer. This approach is, however, suitable only for fully automated program transformation, which is of little if any practical use for "real-world" applications where interactive remediation is typically required.

The DMS approach (Baxter, I. D., Pidgeon, C. and Mehlich, M. "*DMS: Program Transformations for Practical Scalable Software Evolution*", In Proceedings of the IEEE International Conference on Software Engineering (ICSE '04), Edinburgh, United Kingdom, May 23-28, 2004, pages 625-634) similarly proposes a separate specification of real-world code, its transformation, and the programming language. Accordingly, this related formal approach is also of limited practical application.

These two approaches, described directly above, fail when a formal language specification is either not available, or is ambiguous (that is, is not definitive). Accordingly, absent a formal computer language specification, existing techniques are unsuitable for source-to-source transformation of computer source code. There is thus a need for a way of addressing these and other deficiencies of existing approaches to source-to-source transformation of computer source code.

SUMMARY

A source-to-source transformation framework for transforming computer source code is described herein. The described framework is capable of supporting dialects of computer programming languages that do not have formally defined specifications. As described herein, such dialects are subject to multiple and mixed dialect definition, or have definitions that are incomplete or ambiguous. Moreover, the described framework applies more generally to disparate programming languages, not only to multiple dialects of a particular programming language.

Typically, technical problems arise when dealing with dialects of a single computer programming language, in which there is inadequate documentation for individual dialects, and possibly also ambiguous or non-conforming dialect definitions. Such inadequacies may exist, for example, as a consequence of software maintenance-related activities that involve multiple legacy definitions, or evolving definitions. This is the type of problem with which the detailed example is primarily concerned, though the framework described herein can accommodate analysis and transformation of multiple languages.

A software tool implements the described framework, and is constructed on the basis that, in practice, only a few mainstream dialects of a language family find exact analysis coverage in a unified tool. (Dated, minor, or newly-developed dialects have limited or no support.) Typically a compilation process is organized to represent a source program in multiple internal representations or intermediate forms prior to emitting the output or object code version of the program. Exact analysis means that programs written correctly in the mainstream dialects can be fully compiled/translated to all the intermediate forms supported by the compilation/translation tool. Thus analyzers/source-to-source transformers working on the intermediate forms have no difficulty in handling the programs expressed in terms of the intermediate forms.

The described framework is implemented using existing compiler technology, such as front-end preprocessors, lexers and parsers, which are suitably modified to implement the described framework. Compilers/frontends are invoked on source code with a variety of dialect settings, enabling a given source code to be analyzed either completely, or in parts. The extent to which a program is analyzed depends upon how completely it finds representation in the intermediate forms of the compilation process. A map is generated of the intermediate forms thus created, indicating their individual validity regions.

Intermediate forms depend upon each other in their creation needs. An intermediate form requiring a program to be represented beforehand in another intermediate form is dependent on the latter intermediate form (e.g. a parse tree depends on a program's lexer stream). A dependent intermediate form typically represents the results of a deeper analysis/digestion of the source program than the intermediate form it depends upon. Ability to represent a program in a dependent intermediate form is harder than the ability to represent the program in the easier, less digested, or lower intermediate form. In the proposed framework, an analyzer/transformer operating on any given form is able to shift to lower intermediate forms due to invalid regions in a favored form. Thus it utilizes a deeper intermediate form only to the extent that it has been validly created for a program, shifting to a dependent intermediate form when valid deeper representation is not available. In the limit, an analyzer shifts all the way down to the original source code of the program itself, which is also an intermediate form in a trivial sense. In the proposed framework, while analysis is described in terms of a plurality/hierarchy of intermediate forms as above, transformation associated with an analysis is preferably described directly in terms of the original source form. This obtains an additional benefit of making the transformation component of the source-to-source analysis and transformation system language/dialect/intermediate form independent. Other embodiments, choosing to express transformation components in other intermediate forms are straightforwardly possible.

The error-handling mechanism of a compiler/compiler frontend allows obtaining analysis fragments for the "uncovered" features of an unsupported dialect by enabling analysis of the feature as much as possible before breaking into an exception/error causing program input skipping or input repair. The exception/error may occur when creating a deeper intermediate form representing the feature, so the resultant analysis fragment comprises a valid representation of the feature in a lower intermediate form. Features that are in common with a fully supported dialect's features are covered without error as in the supported dialect. In this manner the proposed framework recovers from routine compiler technology maximum analysis fragments representing an un-covered dialect program.

Furthermore, novel error handling technology in the proposed framework supports extra repairs carried out to an input program by analyzing the analysis fragments obtained using routine compiler technology. The routine and extra repairs are stored as edits in a map intermediate form used for highlighting validity/invalidity regions of individual intermediate forms. The edits serve program analysis by shifting a source program to a neighboring analyzable source program which finds more complete representation in various intermediate forms. Tracking the edits preserves input program semantics by noting the exact distance/deviation of the source program from the well-represented program. The framework makes the well-represented program and its intermediate forms, and the map layer and its edits available to all kinds of program analyzers and transformers for further convenient program analysis and manipulation.

The described transformation process uses the standard practice of layered compiler analyses. That is, preprocessing is followed by lexing, which is followed by parsing and symbol analysis, which is followed by type analysis, and so on, with each analysis yielding results used by the succeeding analyzer. The standard practice is followed in multiple iterations in order to allow editing analysis plug-ins derive more well-represented programs from the original one. The intermediate form obtained by each standard compiler analysis is analyzed at the same level in any iteration, and the validity of the result is used to partition an annotated preprocessed version of the original source code into understood and analyzed portions, or not. Edits made to the source program in order to repair its unrecognizable features to recognizable constructs are also stored in this annotated preprocessed form.

Post editing iterations, the preprocessed source codes, thus labeled and annotated, form a map datatype. This map datatype guides further analyses peculiar to software maintenance activities, such as porting and migration, and the corresponding source code rewrites (remediation). These analyses use the map datatype to operate in valid regions of individual analyzer results (lexer, parser, and so on).

Construction and use of the map datatype is based upon location information in the text of the original source text. Location information in source code is a universal currency common to all analyzers. Standard analyzers—preprocessors, parsers, and so on—typically save and provide detailed location information for error-handling and debugging support. Human interaction is facilitated by reliance on source locations, since presentation of results to the user, and capturing of user directives, can be done via an editor window operating using source locations.

DETAILED DESCRIPTION

Table 1 below presents an example code fragment in the C programming language that illustrates the described approach herein.

TABLE 1

```
int main( )
{
    for(int i=0; i< 8; i ++)
    {
        for (int j = 0; j < 8; i--)
            i = i+ j;
        for(int k =0; k < 8; k= k+j);
        for (int p=0; p < 8; p++ )
            p = p+ k;
        for (int foo = 0; foo < p; foo = foo + 3.2);
```

TABLE 1-continued

```
    }
    return 1.2;
}
```

The code fragment presented in Table 1 above includes an outdated "for-loop" construct, in which index variables declared in the loop header remain visible in a scope beyond the body of the for-loop. Index variables and their references manifesting such behavior are shown underlined in the code fragment of Table 1.

Such behavior is disallowed in more modern C language dialects, and index variables in for-loop constructs have their visibility strictly limited to within the actual for-loops in which such variables are declared. Now consider the example of front-end analyzers used solely for modern C dialects. Assuming that none of the underlined, out-of-scope index variables are declared in the global scope surrounding the main procedure, all of the references to variables outside their declaring for-loop constructs are captured as an undeclared-variable-reference error by the front-end analyzer. The entire expression containing a variable reference is left unanalyzed, and no semantic abstract syntax graph (ASG) is constructed for the expression. Minimally, an ASG node for variable reference, with the reference connected to its variable declaration via the symbol table is missing. A partial ASG is constructed, having error nodes with limited information replacing the ASG sub-trees that remain unanalyzed.

Note, however, that there is still much information that the front-end analyzer generates. For example, the code fragment lexes perfectly, since all the tokens generated for the code fragment are legitimate in modern C dialects. Only their semantic arrangement as a for-loop construct is questionable. Using the map datatype described above, an analyzer recognizes the bounds of the unrecognized sub-trees, and checks for the lexeme stream contained within the missing region. The symbol tokens in the lexeme stream for the subtree are recognizable, and a scope-wise emulation of the old for-loop scope behaviour leads to connecting the variable name references to their loop declarations, and recognition of the individual behaviors as instances of outdated for-loop constructs. Thus it becomes possible to discriminate (and then further analyze) dialect-related old for-loop behaviours from genuine undeclared-variable-reference errors.

Indeed, analyzers such as the out-of-scope issue analyzer emulating old for-loop behavior above, determine how much localized, lightweight or approximate parsing over lexeme streams these analyzers seek to do, as described above. In cases where even lexeme streams are not adequately available, such as (untransformed) embedded code of a different language (that is, which fails to adequately lex as C), the analyzers work directly with the text of the source code of the unanalyzed region, or seek generic or other lexing support. This may be achieved by running a tokenizer that separates tokens solely by whitespace, or running a different language lexer. The running of the tokenizer may be invoked directly by the analyzer or the lex stream may be available from the running of a distinct frontend as a part of the map creation exercise.

The map datatype is thus constructed and used for inter-analyses communication. The activity of remediation (that is, post-analysis code transformation) is also performed using location information, in terms of text editing operations such as paste, copy and delete. Since the deviation of an unknown (i.e. unsupported) source code dialect from a set of covered, standard dialects may not be clear a priori (at least as far as the presence of uncovered, non-standard language constructs in a given application source code is concerned), building a map for each of multiple (iterative) front-end runs (front-end comprising preprocessor, lexer, parser, type-checker, and so on) on the application source code is useful. Each front-end run may cover the un-recognized constructs differently, allowing choice regarding how best to cover the same.

Each front-end run corresponds to building the source code on a setting (compiler flags, command line options, environment variables) close to the one actually used on the application's current build platform. Maps constructed for all these front-end runs can be compared with each other under a variety of policies (such as "maximize the sum of valid region sizes") to identify which front-end and corresponding map are suitable for further work. User interactivity in this process is desirable, for example, in suggesting and/or pruning the front-ends to be considered.

The provision of multiple intermediate forms ranging from original source text to fully analyzed fragments is performed without compromising stability. Such scenarios are prevented by forking the front-end tools in separate, monitored processes so that a catastrophic stop in one does not corrupt the others. These processes communicate with the process/processes of the tool for source-to-source transformation to construct the intermediate forms and a corresponding map.

Figure 1:
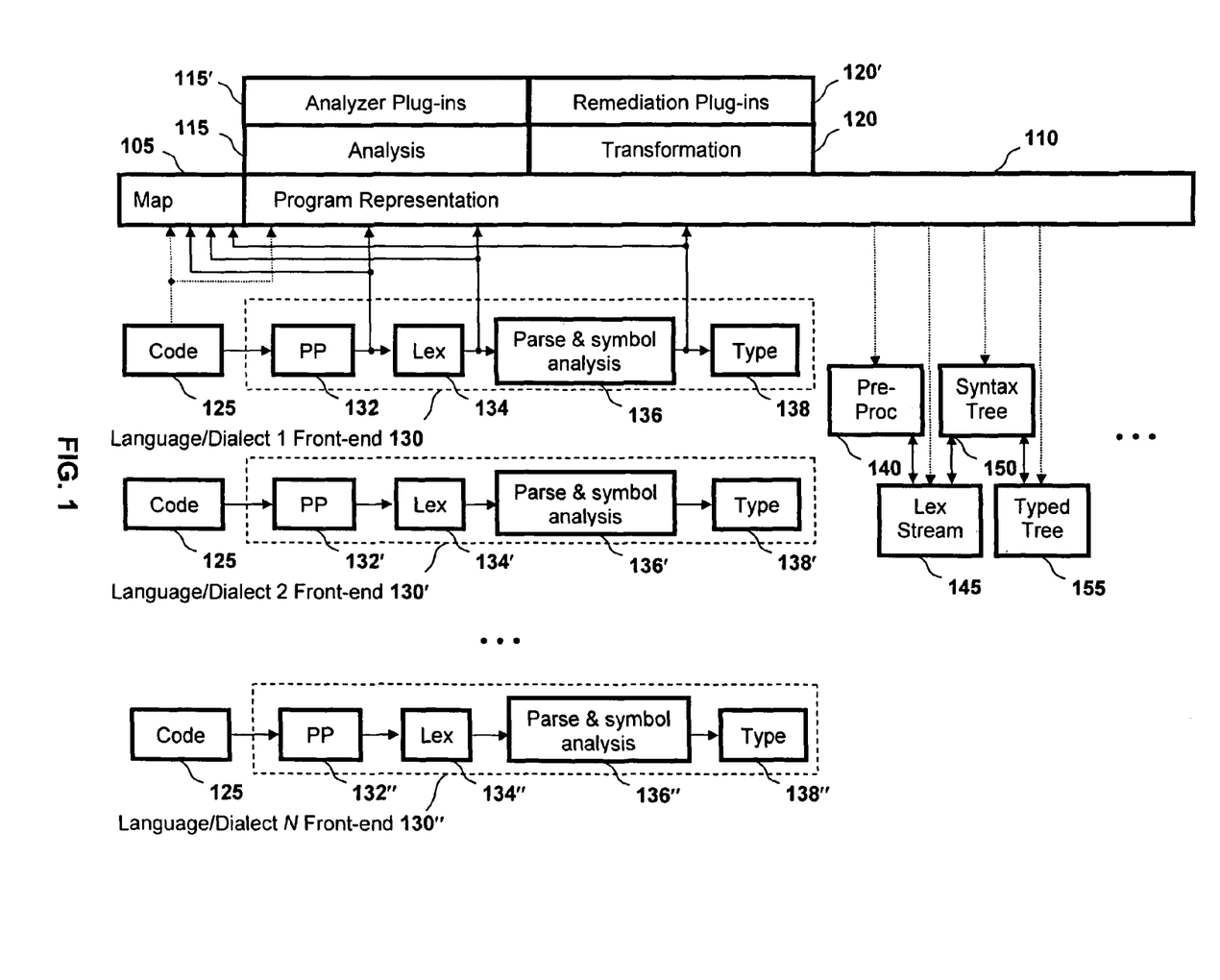
FIG. 1 is a schematic representation of an architecture for a tool for source-to-source transformation, as described herein.

FIG. 1 schematically represents the overview architecture of a software tool, as described herein, for source-to-source transformation. Multiple dialect front-ends 130, 130' and 130", each corresponding to specific build settings (compiler and environment flags), are invoked on input code 125 to yield a map 105 and a program representation 110 for the code 125.

Each front-end 130 comprises individual tools such as a preprocessor 132, a lexer 134, a parser 136 and a type checker 138. Each front-end tool 132 to 138 feeds its successor front-end tool and intermediate outputs are also captured from those front-end tools 132 to 138 as intermediate forms 140, 145, 150 and 155. The captured intermediate outputs are also feed to the map 105 to determine valid and invalid regions.

The source code 125 itself is an intermediate representation and, as indicated by a dashed line, is provided as input to the map module 105 and the program representation module 110. Multiple front-ends 130, 130' and 130" are run on the same code 125 to generate corresponding intermediate forms 140 to 155 and their respective maps. Three front-ends 130, 130' and 130" are represented in FIG. 1, and though only one set of intermediate forms 140 to 155 is depicted, each of the front-ends 130, 130' and 130" would have corresponding intermediate forms 140 to 155.

An analysis component 115 and a transformation component 120 comprise of individual analyzer plug-ins 115' and remediation plug-ins 120' respectively. Each of these plug-ins 115' and 120' operate on a set of intermediate forms 140 to 155, and their resulting maps 105, to generate various results.

The analysis component 115 and transformation component 120 work with and modify separate copies of the source code 125 (as described in further detail below in the section entitled "Remediation") to prevent respective processes from interfering with each other.

Once a session of analysis followed by transformation, as performed by the analysis component 115 and the transformation component 120 respectively, is complete the resulting modified code can be checkpointed, and stored followed by another such session.

Optional support may also be provided for ancillary analyses, such as an extra lexer run to be added to a map and its collection of standard analyses. These ancillary analyses may be able to provide extra data for use by later analyses that the standard analyses may not have at their disposal. The standard lexer 134 may, for example, be the cause of failure to analyze a given region. The entire stack of analyzers 115 using the output from the lexer 134 would fail on the same region, and the map 105 consequently shows the corresponding limitations. An additional lexeme stream (not illustrated) for the same region is desirable in such a case to assist in further work with this limited map. Such cases can arise when multiple languages are embedded in the same source code 125.

Post-Frontend Analysis

A mainstay of analysis is the abstract syntax tree (AST) form generated by a compiler front-end. The "tree" is walked or traversed repeatedly, depending on the analyzer plug-ins at hand. A technique for tree walking is a context-free walk, in which only the completeness of the walk is guaranteed, and not the order of visiting the nodes. Since all analyzers 115 with this requirement can share this walk, the efficiency of the process is improved. Being able to define an analysis in such a manner is generally preferred.

Special-purpose walks, for example, a depth-first traversal of the lexical scopes, requires attention, since the AST need not be organized desirably for such a purpose depending on the front-end's memory management and other optimizations. For example, consider walks to identify for-index-out-of-scope issues, using front-end dialects capable of parsing the old-style loops without error. In such cases, the AST is constructed completely (as regards this particular issue). In this context, the for-index-out-of-scope analysis can be implemented in both a context-free manner as well as a depth-first-traversal manner, though the former is preferred. In the context-free manner, issues are found by comparing variable reference location with its location bounds for "for" statements. In the depth-first-traversal manner, issues are found by detecting a variable reference to a lexical scope not on scope stack.

Another example of a context-free AST walking analysis is the identification of application programming interface (API) usage for porting purposes. During a tree walk, when function or method calls are identified, one can determine which file, and thus which software package, contains the definition of the called function. Stored knowledge pertaining to the portability of individual package functions can then drive the flagging of difficult calls, and their remediation options.

Other analysis forms, such as lexeme streams or sources, are traversable as lists and vectors.

Remediation (or Transformation)

Remediation or code rewrites may be considered as: deletion of existing code portions, and addition of new ones. One can define the rewrites as source-to-source transformations of the text of source code 125. User intervention occurs conveniently using text and, accordingly, a text editor can be used to implement this aspect of the described remediation framework. Multiple AST forms are generated by the multiple front-ends 130, 130' and 130", the results of which are all unified by the source-to-source transformation tool. The described tool is independent of the front-ends 130, 130' and 130", the intermediate forms 140 to 155, or the analysis component 115, providing that the concerned module provides high-quality location information as regards source files, which is standard debugging-related information.

TABLE 2

Ops ::= Op | Op Ops
Op ::= paste <To, Text> | cut <From, To> |
    copy <Name, From, To> | replace <From, To, Text>
    | shift <To, From, To>

TABLE 2-continued

From ::= Pos
To ::= Pos
Pos ::= <Loc, Qualifier>
Qualifier ::= before | after
Text ::= String | Name The operations are defined in terms of locations (filename, line, column triples) in code sources. A location qualified by "before" or "after" makes up a position. For example, pasting a string can be specified just after or before a source location using the qualifier. A cut can be inclusive of both its ends if the "from" position is qualified by "before" and the "to" position is qualified by "after". A copy operation introduces a name scope with the copied string bound to the specified name. The name is visible to all the operations succeeding the copy operation, as they are implemented in succession order. A successful paste operation, for example, can insert the copied string to a specified position by referencing its name. "Replace" and "shift" are compound operations, "replace" being a cut followed by paste, and "shift" being a (locally-named) copy, cut and then paste.

A remediation operation typically changes the position context of successive operations. A paste operation of, for example, five characters requires later positions to be shifted by the same amount of characters. A run-time component tracks and updates the location context for the later operations. This mechanism operates satisfactorily for non-overlapping operations. For overlapping operations, a later operation can be invalidated by the earlier one (for example, a cut operation making a paste location operation "disappear").

Invalid operations are reported to the user of the tool for source-to-source transformation for manual intervention. Manual intervention itself is modeled using the primitives in Table 2 above.

The operation transformation aspects of the described remediation framework are suitably informed by the approach described by Sun et al: C. Sun, X. Jia, Y. Zhang, Y. Yang, and D. Chen, "*Achieving convergence, causality-preservation, and intention-preservation in real-time cooperative editing systems*", ACM Transactions on Computer-Human Interaction, Vol. 5, No. 1, March 1998, pages. 63-108. The content of this reference is incorporated herein in its entirety.

Edit-Free Map Construction and Use

The map 105 is a multi-layered object derived from the elaborated output of the preprocessor 132, the elaborations comprising the source constructs ordinarily preprocessed away, such as preprocessor directives, comments and (conditionally) un-compiled code. Each layer of the map 105 stores annotations pertaining to one intermediate form 140 to 155. There is an overlap in the information contained in different layers of the map 105, for example, a comment is an unused region for all intermediate forms 140 to 155 beyond the pre-processor 132.

For constructing any given layer of the map 105, the corresponding intermediate form 140 to 155 is walked and location information for valid constructs contained in the intermediate form 140 to 155 is collected, and annotations are generated for them on the map layer.

Error nodes in the map 105 have corresponding skipped, unanalyzed code regions that need to be demarcated as such except that, in general, location information in error nodes may point to probable causes of error as opposed to the bounds of the code skipped (wherein the pointed error cause may lie). The error node itself may be an inner nested node, with the surrounding construct (for example, procedure declaration) seemingly claiming validity of all its contents (including the error node and other say expression error nodes). This can occur if the location range of the enclosing construct is used naively as indicating a valid region, without traversing the construct. Finally, catastrophic stops of the front-end analysis or inability to restart the compiler/front-end analysis after an error can result in incomplete intermediate forms being captured, for which an annotation of incompleteness as a skipped region may not be meaningful.

A walk of the entire intermediate form 140 to 155 is thus necessary to build the corresponding map layer. The map layer represents a sequence of preprocessed code ranges that together cover the entire elaborated preprocessed text form with one of the following set of annotations: {"validly analyzed region", "valid non-code region", "invalid skipped region", "unknown status region"}. "Valid non-code regions" correspond to whitespace-converted regions, such as comments, and code regions that are not compiled due to preprocessor compilation directives. Normal whitespace regions (such as, space, tab, carriage return) are merged into the code constructs that these whitespace regions serve to separate. Error-related code skipping is identified as "invalid skipped regions" and "unknown status regions" corresponding to regions for which front-end analysis behavior is not understood (for example, catastrophic stops). The code skipping annotations can be interpreted as cut edits as described in a later section that constructs a map object with edit operations. A cut removes the code text that is skipped over and hence is equivalent to code skipping. However code insertions due to say error repair are not represented in the present map object constructed in the present section. Hence we describe the present map object as an edit-free map object, although strictly speaking, it does have cut equivalents embedded within it.

Due to the potentially multi-file nature of any given program analysis (such as caused by #includes in the main file being analysed), the map object for a given analysis combines and represents individual maps for all the included files. This is similar to the way in which the preprocessor 132 "inlines" the included files in its output. A map layer is thus simply a string containing annotations (each represented by a single character) which when overlaid on a textual elaborated output of the preprocessor 132 covers it exactly (i.e. has the same size and hence can be compared meaningfully location-by-location) and can be used to interpret the same from the perspective of one particular front-end's generated intermediate form 140 to 155.

Figure 2:
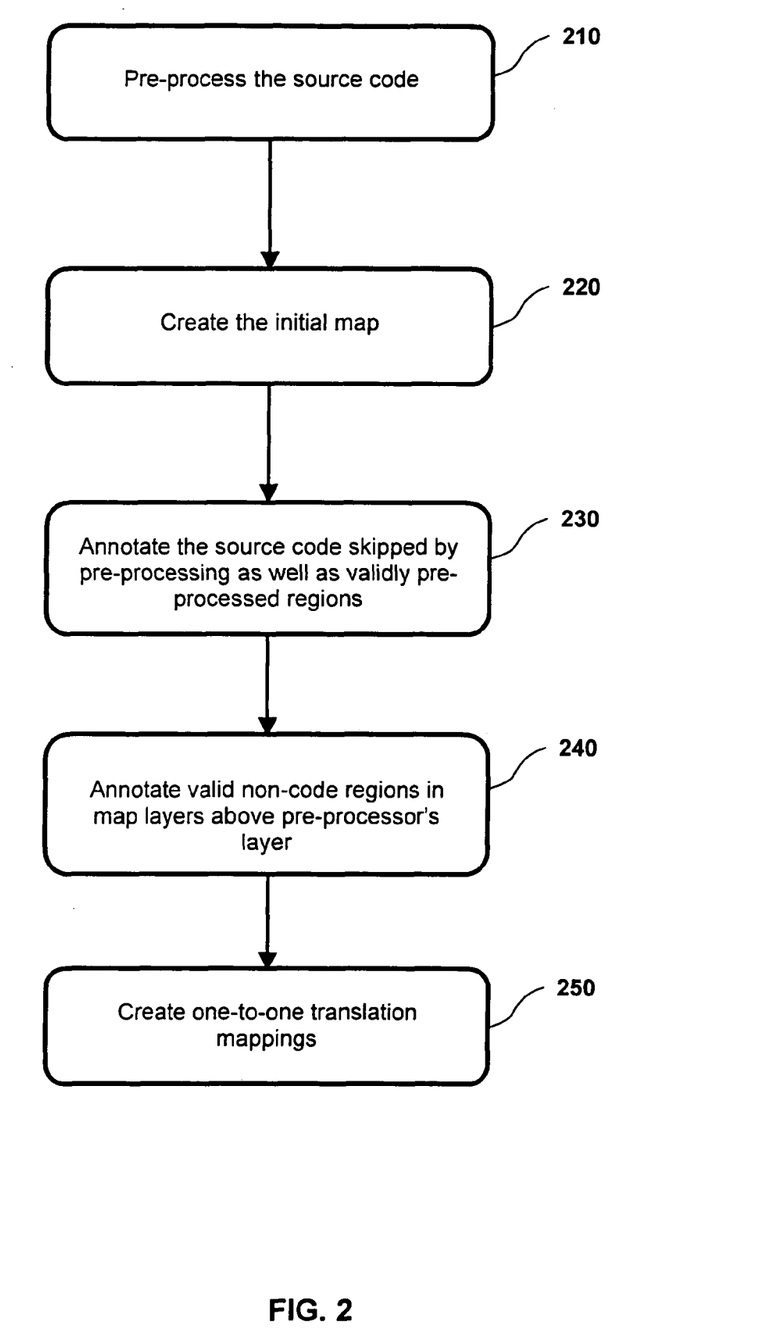
FIG. 2 is a flow chart of steps involved in creating an initial combined map object and an elaborated output of a preprocessor.

FIG. 2 is a flow chart that depicts the steps involved in creating the skeleton of this combined map object and an elaborated output of the preprocessor 132 underpinning the combined map object. This is performed for all map layers in a preprocessor emulation phase, as shown in overview in FIG. 2.

First, the source code 125 is preprocessed in step 210, printing the preprocessing results as text output. This preprocessing is special-purpose in that it also includes comments, uncompiled regions, and compiler directives "as-is" in the output. A special character is outputted for each contiguous source text region skipped or left by the preprocessor 132 due to errors, thus resulting in an elaborated version of the output of the preprocessor 132. The initial structure of the map 105 is created in step 220 and comprises a character vector containing whitespace characters (a whitespace string) of the same size as the textual elaborated preprocessor output. This map structure is created using the elaborated preprocessor output, and represents empty map layers for all intermediate forms 140 to 155. This whitespace is later overwritten with annotations for different regions of the map.

The source code 125 skipped by the preprocessor 132 in step 210 is then annotated in step 230 on the preprocessor map layer. The source code 125 text is skipped by the preprocessor 132 due to errors, and is marked as "invalid skipped regions" in the preprocessor map layer for the locations containing special error characters in the elaborated preprocessor output. In case the preprocessor 132 aborts, the text is marked beyond the last sequentially and properly preprocessed location as an "unknown status region", while annotating all the remaining text regions in the preprocessor map layer as "validly analyzed region". "Valid non-code regions" are annotated in step 240 in the map layers above the preprocessor layer. The "valid non-code regions" include and highlight the commented, un-compiled code, and "as is" directive regions in map layers above the preprocessor 132.

Finally, translation mappings are created in step 250, between file locations and map indices as follows:

The elaborated preprocessor output is effectively the same as the input source code 125, except that code generated for #include processing is pasted right after the corresponding directives. Since, in normal preprocessing, un-compiled code, comments and directives are stripped, the notion of stripping is captured not by actually removing the constructs from the elaborated preprocessor output, but rather by annotating the regions for these directives in map layers (other than the preprocessor's own) as "valid non-code regions". In case optional support for macro analysis via the map 105 is required, the macro invocation directives are annotated as "validly analyzed macro region" instead of "valid non-code region" as described later.

Since artificial code (that is, not present as-is in the original source file) is represented in the map due to preprocessor directives such as #include statements and macros, the index of the map 105 does not retain a direct correspondence with file locations of source text, which is needed since the map is constructed and manipulated in terms of source locations.

For #include statement introduced code, the map of the included file is inlined within the main file map, just after the ending location of the corresponding #include. The mapping from indices in the enlarged map to locations in individual files is a one-to-one, partial mapping (note that a file location also specifies the name of the relevant file) due to macro-expanded code and the mapping from file locations to map indices is also partial (due to preprocessor-dependent treatment of whitespace between lex tokens) and one-to-one if a file is allowed to be included only once, which is usual. In case a file is included more than once, the mapping is defined in terms of inclusion instance, which continues the mapping as a one-to-one mapping. In other words, one-to-one partial and fully enumerable translation functions between map indices and file locations are needed, and provided using existing techniques. In effect counters are kept tracking the current file location and current map index during the preprocessing step. Location ranges in the current file are identified which correspond to index ranges except for an additive constant. Shifts in the additive constant are noted and the mapping constructed as an association list between location ranges and index ranges with the stored additive constant allowing translation between the two domains. Locations in skipped input regions are mapped to the error character in the map. The error character is mapped to the skipped region bounds separately, using separately-kept data structures which store the bounds for each such region explicitly.

The preprocessor emulation proceeds sequentially on the source text, generating the map skeleton for all layers (as described above) including the one for the preprocessor form itself. Skipped input text is labeled as an "invalid skipped region", and the map for the skipped text is allocated a constant amount of space to represent the region in all map layers.

The elaborated output of the preprocessor annotated as the invalid skipped region is represented by a distinct error character (all error representatives are distinct from each other and normal code characters). The bounds of the invalid skipped region are stored as preprocessor stop and restart positions (including filenames) in a separate data structure.

If preprocessing 132 aborts, the text beyond the last sequentially and properly analyzed location is marked as an "unknown status region", and represented by an error character in the elaborate print output accordingly (with preprocessor stop position, just after the last validly preprocessed position recorded separately). The translation functions between source locations and map indices are built in the same preprocessor emulation process and take into account adjustments due to skipped code regions in the preprocessor's own map layer. Note that, instead of emulation, an existing preprocessor may be modified to achieve this result, since preprocessors 132 are relatively simple tools.

Figure 3:
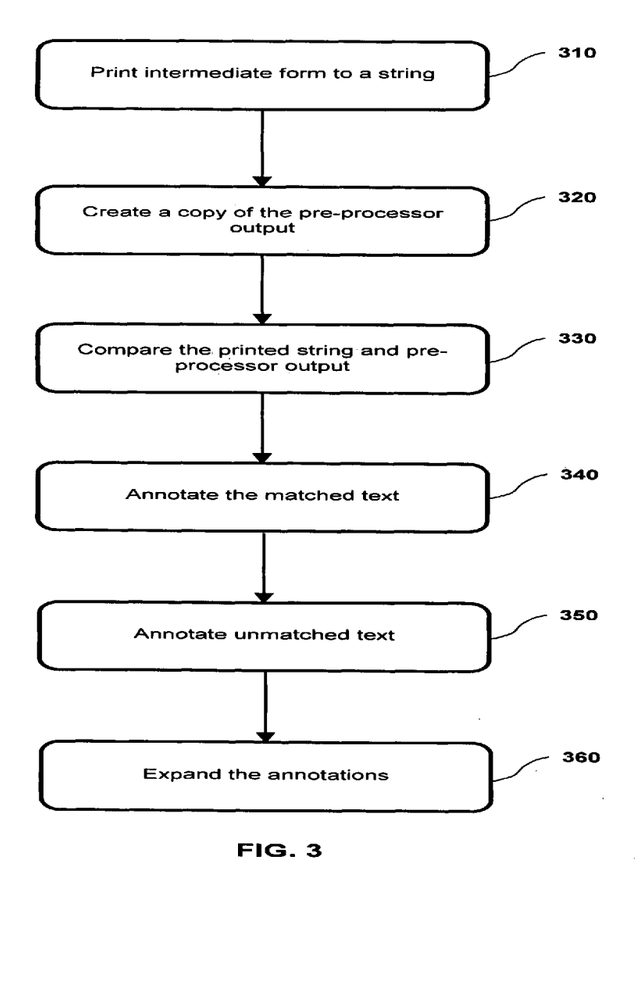
FIG. 3 is a flow chart of steps involved in completing an initial map for post-processor intermediate forms.

FIG. 3 gives an overview of how the map layers are filled for the post-preprocessor intermediate forms 140 to 155. Each intermediate form 140 to 155 is walked and a print-compare problem is solved for the intermediate form 140 to 155 as follows. The intermediate form 140 to 155 is printed (overwritten) on a whitespace string the same size as the multi-file map, in a map-index-preserving manner by walking the intermediate form 140 to 155 in increasing (print) order. The stored file location information of a construct to be printed is translated to the map index position by using the translation functions computed in FIG. 2.

Starting in step 310 intermediate forms 140 to 155 are printed to a string. Unique special characters are printed to designate error nodes, if there are any present in the intermediate form 140 to 155. The incomplete map layer of the present form constructed by the preprocessor 132 in FIG. 2 is overlaid on the printed string and valid non-code regions are turned to whitespace in the print string.

Configurations options for the print (for example, which delimiter to use in the context of multiple choices) are chosen to match with the options available in the original source code 125. This can be performed by checking the elaborated preprocessor output computed as a result of the process depicted in FIG. 2, in the vicinity of the map indices being used for the print. Error nodes, if any are printed as unique special characters, are each different from any character in the source code 125.

A copy of the elaborated pre-processor output is created in step 320. The printed string and the pre-processor output are compared in step 330. Error nodes represented by unique characters always come across as differences. Prior to handling errors, first the matching non-whitespace substrings are identified in step 340. Each such substring is annotated as "validly analyzed region" in the map layer for the present intermediate form. In step 350 next, for each error character, a maximum contiguous map region is identified overlapping the error character and containing no sub-regions that have been annotated as "validly analyzed region". Each such region is annotated as "invalid skipped region", unless the region is adjacent to the end of the map layer in which case it is annotated as "unknown status region". Finally, all un-annotated regions covering whitespaces in the elaborated preprocessor output are annotated the same as any neighboring region, while minimizing expansions of "valid non-code regions". This is carried out in step 360, wherein the annotations generated in steps 340 and 350 are expanded in step 360, in contiguous spaces in any order to fully cover the entire map 105, first maximizing "invalid skipped regions" and "unknown status regions", then next maximizing "validly analyzed regions", and finally at the lowest priority maximizing expansion of "valid non-code regions".

Analyzer plug-ins 115' use the map object as follows. An analyzer 115 suited for a particular form is allowed to walk and use the intermediate form 140 to 155 as usual, except when the analyzer 115 encounters an error node in the intermediate form 140 to 155, or when the intermediate form 140 to 155 is incomplete. When such a situation is found the analyzer 115 is free to search the map 105 to find the bounds of the corresponding "invalid skipped region" or "unknown status region". This can typically be done using a probable error location (if available), which when translated to a map index points to the error region. An alternative is to find some valid constructs succeeding and preceding an error node and then searching for the error range in between the map regions for the valid constructs. Once the tightest error region bounds are identified, the analyzer plug-in 115' is free to use valid information in any other lower forms for the region instead of walking the region in the current invalid form.

The analyzer 115 is also free to work with the always-available source text for an error region by looking up the source text corresponding to the error range as, for example, in an interactive engagement involving the human user.

Map with Edits Construction and Use

An alternative map framework comprises use and tracking of edit operations and preprocessing tokens within a token-based elaborated preprocessor output to obtain and give effect to annotations common to all intermediate forms 140 to 155 such as "valid non-code region" and commonly, "invalid skipped region". The edit operations also obtain an extra power, comprising of corrections made by the usual frontend technology, or the remediation component of the framework described herein, to be explained and categorized appropriately in the map form so that analyzers 115, such as an out-of-index porting issue analyzer, can work with the map and various intermediate forms. Briefly, this power is obtained since the edit operations allow description of corrections made such as new text insertion, text replacement, made to the input sources in order to compile the same. This power covers input skipping using a cut edit operation (to obtain the effect of the annotation "invalid skipped region" in a common manner across all intermediate forms 140 to 155), but is general enough to cover all input changes. The map layer thus tracks the modified program translated to various intermediate forms 140 to 155 and the sequence of modifications made to the source code 125, thereby allowing reasoning to be carried out about the translated source code itself, the unmodified source code 125, the sequence of modifications and combinations thereof. The map layer is a single layer, common to all intermediate forms 140 to 155, with annotations pertaining to an individual form captured as a mapping specific to the individual form.

The alternative map framework above unifies the lightweight syntax analysis approach described by Murphy, G. C., "*Lightweight Lexical Source Model Extraction*", ACM Trans. Soft. Eng. Method., Vol. 5, No. 3, (July 1996). 262-292, with the full front-end-based analysis approach described in Devanbu, P. T., "*GENOA—A Customizable, Front-End-Retargetable Source Code Analysis Framework*", ACM Trans. Soft. Eng. Method., Vol. 8, No. 2, (April 1999). 177-212 to create recognition and non-recognition zones of programs where flavours of lightweight, or full approaches apply. The alternate framework supports custom, error handling plug-ins that transform the source code 125 minimally to align the code 125 with recognized dialects/constructs. This increases the full recognition zones of the code, while retaining semantic consistency by encoding within the map 105 all transformation details for reference.

As described in more detail below, the token stream underpinning the map 105 is itself dialect specific, recognizing pre-processor 132 and lexer 134 differences among vendor offerings. This enables nuanced mapping of a given code 125 for different dialect features, with compression of the mappings to the common, un-preprocessed source form for inter-dialect comparison, as for example in identifying the nearest tool-supported dialect to unknown code.

Figure 4:
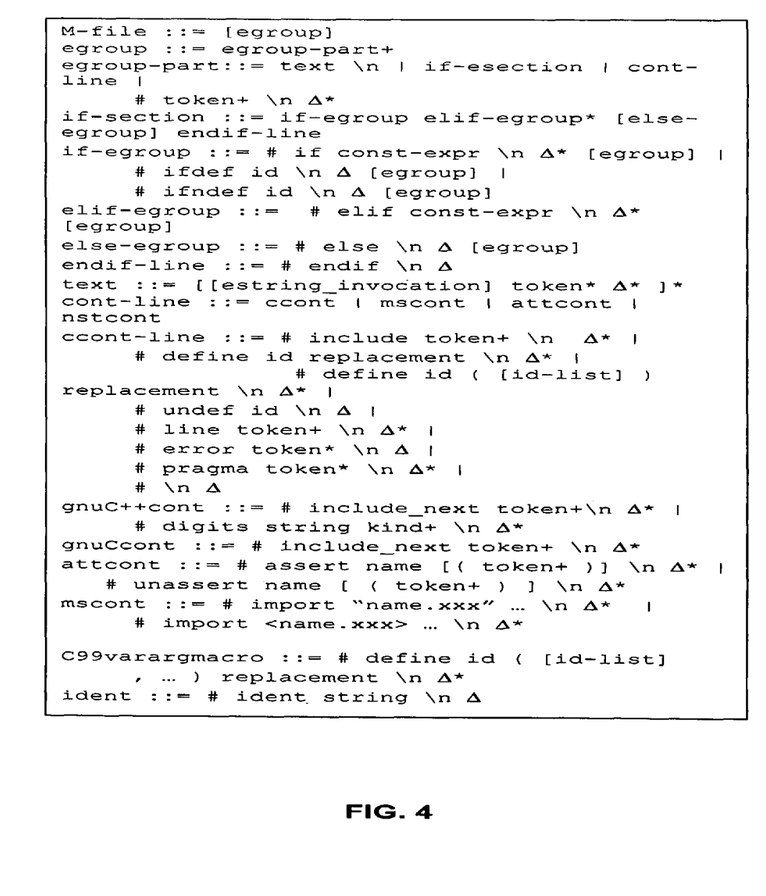
FIG. 4 shows the syntax of instrumented C/C++ preprocessing tokens making up a map layer with edit operations.

FIG. 4 shows the syntax of C/C++ preprocessing tokens normally included in the map layer. The syntax modifies standard C/C++ preprocessing syntax to save preprocessing directives and to incorporate edits and some dialect-specific constructs. A map for source code 125 is generated by instrumenting a compiler front-end 130, like the compiler front-end from the Edison Design Group (www.edg.com). The syntax is written in a compressed notation incorporating features like Kleene closure for pithiness.

Besides generic C, map support includes control line features for Microsoft, AT&T, Gnu C, and C++ dialects. The vararg macro feature included in the C programming language standard is also supported. Include_next is a gcc extension wherein search path succeeding a currently found file is used in next include processing. The Ident feature is the same as #pragma ident string \n. The assert/unassert directives are from AT&T System V, release 4. An assert directive can be tested by #if #name (token-list), which is true, if one of name's values is in the token-list. The . . . tokens in import directive are ignored (the directive processing is partial). Although coverage of C/C++ dialects/features as enunciated in FIG. 4 is partial, comprehensive coverage may be obtained by applying the principles described herein similarly to the uncovered constructs.

Beyond nominal definition in terms of preprocessing tokens, the map layer includes full lexing support. Preprocessing tokens are recognized into lexical tokens and generalized (qualified) identifiers based on specific dialect flavours, such as the min and max operators for Gnu C++, Bool and complex types for the C programming language standard, try and ASM blocks for Microsoft, and differences such as the use of . as a qualifier (::) in CFront, etc. Other dialect differences include PCC's and other compiler's macro and include processing peculiarities.

Figure 5:
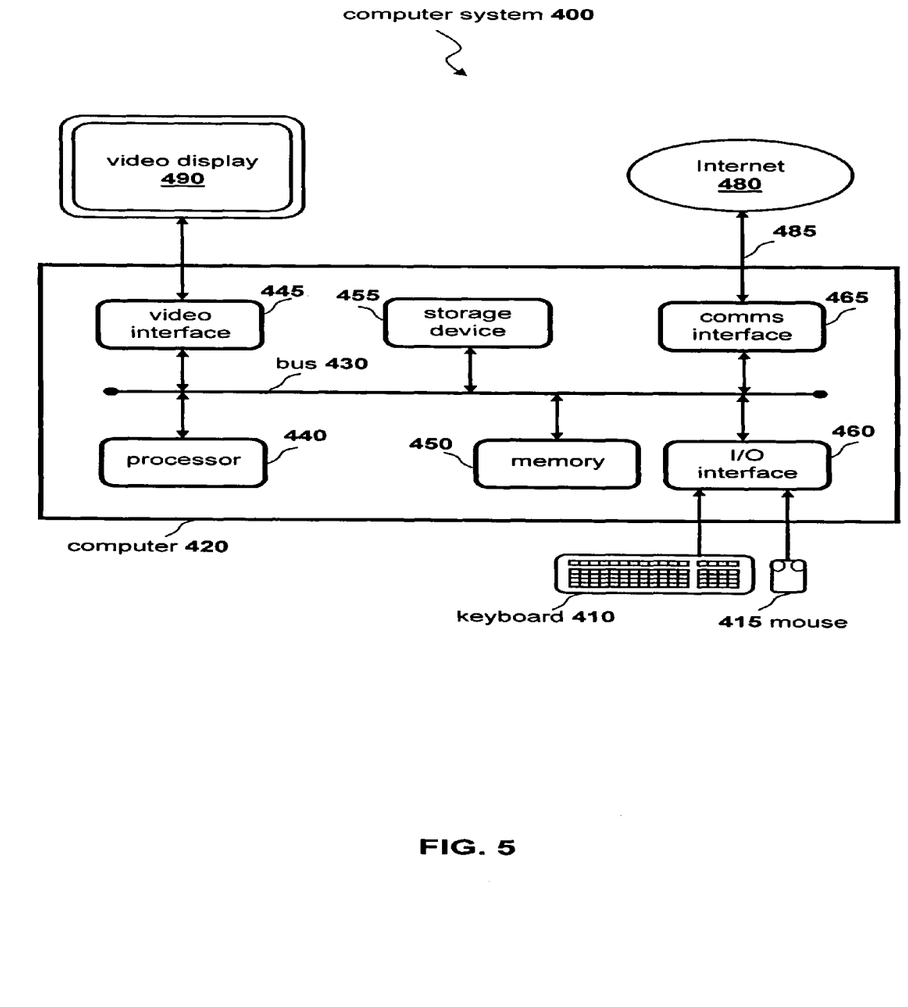
FIG. 5 is a schematic representation of a computer system suitable for performing the techniques described herein.

Location information is not made explicit in the syntax of the token stream presented in FIG. 5. It is left implicit that each token will carry its location information. Compound edits (Δs) assume the availability of such information. A compound edit corresponds to one or more operations (ops) given in Table 2. Compound edits are stored in a map right after the corresponding control line/construct as a general convention. Tokens belonging to macro expansions carry null location information. The meaningful location for such expansions is carried by invocation tokens instead, which is captured as a string annotation token in the text line production.

Once the map token stream becomes available, it provides a handle on the program geography, with earlier tokens corresponding to earlier locations in the program and later tokens to later positions. Location information is used to relate constructs fully recognized and translated to AST intermediate form to the corresponding token zones in the map layer and on to the source code 125 in the original code files. Query functions identify the boundary tokens for individual map zones. Traversal of AST representation for routine program analysis is able to refer to the map 105 via locations to verify that it is working in valid AST constructs and if not, then to fall back to say the map layer to work at the lower token stream form contained within the map layer itself or at any other intermediate form. Edit information needs to be visited to tackle approximations made in the attempt to bring the program code into some analyzable form.

In the present tool, input skipping (a cut edit), occurs when the token stream cannot be formed satisfactorily. So for instance, as a default option, a situation like the #error directive, which ordinarily would cause preprocessing and compilation to stop catastrophically, is cut out into an edit, which allows continued processing of the program to take place. The maximal, best efforts map is arrived at using an instrumented front-end 130 and continued with to make a semantic abstract syntax graph (ASG) form. Source-to-source transformers 115'/120' are free to work with the abstract syntax graph form and others for their specialized analysis and modification purposes, as is described in the example applications presented below.

Consider the following code fragment:

TABLE 3

...

1 union {int data; char bytes[4];} a;

2 long I;

...

3 for (int j = (*((int *) &i) != ((int) i))

4                ? a.bytes[0]: a.bytes[3];

5            j<N; j++) { ... }

6 j++

In the example presented the dialect identity of the code fragment presented in Table 3 is sought. Building the code with different dialect settings (compiler flag settings), generally manifests an error/incomplete node in the AST constructed for the j++ expression in line 6 of the code fragment. Only when the old CFront-style for-loop feature is turned on is this (unknown) variable recognized as being the index variable of the for-loop on line 3. Pruning the valid dialects for this code to old CFront codes, a next discovery transpires for the Endian predicate initializing variable j on line 3. The predicate is a commonplace idiom, and is described at http://www-106.ibm.com/developerworks/eserver/articles/mig_tru64aix.htm. A scalar type is viewed with a smaller-sized type aligned along its left and/or right boundaries depending upon the Endian platform. Checking the validity of the idiom finds that the types involved (long and int) need to be differently sized, which is the default for 64 bit platforms, but not 32 bit. The dialect of the code fragment of Table 3 is thus identified as being from the old CFront, with 64-bit platform settings (it can also be identified as a fragile, 32-bit Little Endian setting where its type-size error remains hidden).

This checking of the Endian predicate shows how semantic dialect checking goes beyond (typed) AST/ASG formation to (best efforts/idiomatic) intent estimation. Consider for example the following line of code:
c=a //* divisor */ b As a result of a "quiet changes" in the C language standards, the designation of a comment changed from /* ... */ to //. Dependent upon the comment designation used, the above line of code translates to c=a/b or c=a.

Identifying a dialect includes finding the settings for which minimum error/incomplete semantic ASG nodes are formed and intent estimation seems to be maximally accurate. Such dialect settings may not be available in the front-end tool to work with, so source code editing to validate and correct the source code 125 for another dialect may have to be carried out. In FIG. 4, inability to support the CFront-style for loop could be handled by shifting to the map token stream for j++ when the AST error node is encountered. Alternatively, an error-correction plug-in for the old style loop could straightforwardly modernize all loops by shifting their variable declaration out from the loop headers into the surrounding scope, enabling a complete AST with no error nodes to be formed. Similarly, the Endian predicate could be made more robust by changing the predicate type from int to char, which is smaller than long in all contexts. Ability to remove error nodes by steps such as above would indicate presence of these dialect-specific constructs and thus identify the dialects themselves.

In the example of FIG. 4 it is possible for edits to generate a semantically-equivalent program of a different dialect at the AST-level itself. This may not always be feasible when editing a program for recognition. For instance, consider a UPC program, whose UPC constructs cannot be recognized by a given front-end. Correcting the program by generating an equivalent program by say manually digesting the UPC directives and including the whole UPC run-time in the sources is a very extensive code transformation, which besides being impractical may well not serve the purpose of invoking a front-end thereafter. In such scenarios, edits by a UPC-specific correcting plug-in serve to solely eliminate the un-recognized constructs (the UPC-specific tokens), so that a regular program can be recognized fully and a code transformer be written in terms of the available UPC-less AST nodes that would be cognizant of UPC by referring to UPC constructs via the embedded edits in the map layer.

Finally, consider the commonplace scenario of analyzing a program without all associated include files available for the analysis. The inability to provide all the include options as part of the compiler settings is the same as having only partial support available for the required dialect. A missing include file can be treated as an empty file, with discovery of the information required from the include left as an incremental exercise as the program compiles. Each time an entity is needed which is missing, a declaration for the entity is minimally formed that is adequate for continuing the compilation exercise. The list of edits needed for such a minimal list of declarations is amortized into the candidate include files, which finally become the substitute, artificial include files for the missing ones. Program analyses and transformations based on artificial includes would be cognizant of the artificiality, as it would be made evident in the map layer, where the artificial includes are recorded.

Computer Hardware

FIG. 5 is a schematic representation of a computer system 400 suitable for executing computer software programs. Computer software programs execute under a suitable operating system installed on the computer system 400, and may be thought of as a collection of software instructions for implementing particular steps.

The components of the computer system 400 include a computer 420, a keyboard 410 and mouse 415, and a video display 490. The computer 420 includes a processor 440, a memory 450, input/output (I/O) interface 460, communications interface 465, a video interface 445, and a storage device 455. All of these components are operatively coupled by a system bus 430 to allow particular components of the computer 420 to communicate with each other via the system bus 430.

The processor 440 is a central processing unit (CPU) that executes the operating system and the computer software program executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or any other suitable storage medium.

The computer system 400 can be connected to one or more other similar computers via a communications interface 465 using a communication channel 485 to a network, represented as the Internet 480.

The computer software program may be recorded on a storage medium, such as the storage device 455. Alternatively, the computer software can be accessed directly from the Internet 480 by the computer 420. In either case, a user can interact with the computer system 400 using the keyboard 410 and mouse 415 to operate the computer software program executing on the computer 420. During operation, the software instructions of the computer software program are loaded to the memory 450 for execution by the processor 440.

Other configurations or types of computer systems can be equally well used to execute computer software that assists in implementing the techniques described herein.

Extension for "Macros" Support Via Map

As an extension of the techniques described herein, one can provide analysis support for language constructs such as "macros" that generate code with no corresponding code locations in the original sources. The location for a code construct, such as an expression obtained from expanding a macro invocation, does not exist in the same sense as the location of an ordinary expression in a program. The location for such an expression is thus an artificial entity. Besides delineating invalid analysis regions, the map datatype also delineates macro invocation regions (starting and ending positions of the macro invocation directives) and similar constructs, to allow analyses a view into the multiple intermediate forms generated for the invocations. So, for example, the search for a specific macro name can be performed in the intermediate forms where names are yet not been preprocessed away (e.g. source form), in the specific regions pertaining to individual/recursive macro invocations.

The annotation "validly analyzed macro region" can be added to the set of available annotations. For the preprocessor map layer, the macro annotation is a specialization of "validly analyzed region" and can be ignored and read as "validly analyzed region", if no macro analysis is performed. Macro invocation directives are saved "as is" in the elaborated preprocessor output besides expanding them. When providing support for macro analyzers, the saved macros invocation directives in the elaborated preprocessor output are annotated as validly analyzed macro regions in the preprocessor map layer. For the map layers above the preprocessor layer, the macro invocation directives are annotated as "validly analyzed macro region" instead of the "valid non-code region"

used for other directives. For macro analysis, the "validly analyzed macro regions" in any map layer above the preprocessor can be searched and translated to source locations using map index to location translation functions. The elaborated preprocessor output can also be looked up under the "validly analyzed macro regions" to obtain the macro invocation directives saved in the output for macro-related analyses.

Macro invocations are similar in nature to #include statements, in the sense that both are preprocessor directives not present in the original source file. This also affects mapping from the map index to file locations, which is partial mapping since macro-generated code has no unique corresponding code in the file. An adjustment is thus accordingly necessary to provide a one-to-one complete mapping from file locations to map index and a one-to-one partial mapping from map index to file locations (partial since macro-generated code has no unique corresponding code in the file).

A Source-Level Map Layer

The map layer as generally described is constructed in terms of an elaborated preprocessor output. Construction of a map layer in terms of the source code level itself is also desirable since the source code is always available as a whole. Since a plurality of map objects can be constructed using a plurality of language/dialect frontends (FIG. 1), meaningful comparison of their results is best carried out on a common shared form, which the source code itself provides. To this effect, we describe here how to construct a source-level map object starting from the elaborated preprocessor output-based map object.

As noted in the section on constructing a map layer with edit operations, the lexer/preprocessor tokens in the preprocessor output are arranged in a monotonically increasing order, as far as their source code locations are concerned. The same is true for the token-related strings contained in the edit-less map object also. Except for macro expansions where artificial code without corresponding source locations is introduced, all the other tokens in the elaborated preprocessor output have one-to-one correspondence with source code constructs. The map layer can thus be collapsed to a source-code base along the correspondence between preprocessor/lexer tokens and source code (except for macro expansions). The map layers above the elaborated preprocessor output can similarly be transferred to map layers above a source code base. This is true for #includes also, since at most it becomes meaningful to consider the source code as a multi-file object and not a single file object. In case of repeat inclusion of files, the one-to-one correspondence of tokens in the elaborated preprocessor output to source constructs occurs for the inclusion instance of a given file. Thus annotations such as validly-analyzed regions, or invalidity-skipped regions identify analyzable or non analyzable regions directly in terms of source code. Now it becomes directly meaningful to compare performance of multiple frontends on the source code, or even to decide whether different frontends ought to be applied to different parts of the source code. The frontend which generates the minimum skipped region of source code can be regarded as the best single translator for the source code (the source code is closest to the dialect supported by the said frontend).

Coming next to macro expansions, it is sometimes straightforward to obtain a result such as a homogeneously annotated macro expansion region in the elaborated preprocessor output. Transferring this annotation to a source code base is straightforward, since the annotation can straightforwardly label the macro invocation directive in the source code. Difficulty arises when the macro expansion contains a variety of annotations. If all the expansions of the same macro show the same annotation variety which follows a pattern identifiable in the macro definition, then it becomes possible to transfer the annotation variety to disjoint annotations for the macro definition text. Regardless, in this case, and others, the macro invocation directives themselves remain annotated by the plurality of annotations in their source code-based map. Analyzers using the source-code based map have to handle the annotation plurality from their own perspectives, e.g. optimistic analyzers searching for say "validly-analyzed-region" in the annotation plurality and pessimistic analyzers searching for say "invalidity-skipped-region" in the annotation plurality.

CONCLUSION

The method of transforming source code described herein advantageously contains a map layer and works on multiple dialects and programming languages.

Various alterations and modifications can be made to the techniques and arrangements described herein, as would be apparent to one skilled in the relevant art.

I claim:

1. A computer-assisted method for iteratively interpreting a single source code region written in one computer programming language as another computer programming language, the method comprising an initial iteration comprising:
   generating, by a computing device, from said single source code region a plurality of different intermediate forms each corresponding to a different computer programming language, said generating said plurality of different intermediate forms comprising:
      pre-processing said source code region to create a textual elaborated output;
      lexing said textual elaborated output from said preprocessing to create a lexeme stream output;
      parsing said lexeme stream output from said lexing to create an abstract syntax tree output; and
      type checking said abstract syntax tree output from said parsing to create a typed tree output; and
   generating, by said computing device, a multilayered map associated with each of said plurality of different intermediate forms and each map corresponding to said different computer programming language, said multilayered map representing a sequence of pre-processed code ranges that together cover the entirety of said textual elaborated output with at least one notation per layer of said multilayer map designating:
      a validly analyzed region;
      a valid non-code region;
      an invalid skipped region; and
      an unknown status region.

2. The method as claimed in claim 1, further comprising a further iteration comprising:
   analyzing, by said computing device, the intermediate forms and associated maps generated in a preceding iteration to identify a most suitable intermediate form for said source code region;
   transforming, by said computing device, the source code region based upon the most suitable intermediate form and associated map;
   generating, by said computing device, from the transformed source code region a plurality of different intermediate forms corresponding to different compiler flag settings;

generating, by said computing device, a second map associated with each intermediate form, said second map representing regions within the associated intermediate form that are valid; and recording, by said computing device, said transformation and any transformations recorded in the map of said preceding iteration.

3. The method of claim 1 further comprising a final iteration comprising:

analyzing the intermediate forms and associated maps generated in a preceding iteration to identify a most suitable intermediate form for said source code region; and transforming the source code region based upon the most suitable intermediate form and associated map.

4. The method as claimed in claim 3, wherein said transformation step comprises:

substituting portions of code within said source code region with replacement portions.

5. A computer storage medium readable by a computer tangibly embodying a program of instructions executable by said computer for performing a method for iteratively interpreting a single source code region written in one computer programming language as another computer programming language, the method comprising an initial iteration comprising:

generating from said single source code region a plurality of different intermediate forms each corresponding to a different computer programming language; and generating a map associated with each of said plurality of different intermediate forms, said map representing regions within the associated intermediate form that are valid.

6. The method as claimed in claim 5, further comprising a further iteration comprising:

analyzing, by said computing device, the intermediate forms and associated maps generated in a preceding iteration to identify a most suitable intermediate form for said source code region;

transforming, by said computing device, the source code region based upon the most suitable intermediate form and associated map;

generating, by said computing device, from the transformed source code region a plurality of different intermediate forms corresponding to different compiler flag settings;

generating, by said computing device, a second map associated with each intermediate form, said second map representing regions within the associated intermediate form that are valid; and recording, by said computing device, said transformation and any transformations recorded in the map of said preceding iteration.

7. A computer system comprising:

a processor for executing software instructions;

a memory for storing software instructions;

a system bus coupling the memory and the processor; and a storage medium recording software instructions that are loadable to the memory for iteratively interpreting a single source code region written in one computer programming language or as another computer programming language by implementing an initial iteration comprising:

generating from said single source code region a plurality of different intermediate forms each corresponding to a different computer programming language; and generating a map associated with each of said plurality of different intermediate forms, said map representing regions within the associated intermediate form that are valid.

8. The method as claimed in claim 7, further comprising a further iteration comprising:

analyzing, by said computing device, the intermediate forms and associated maps generated in a preceding iteration to identify a most suitable intermediate form for said source code region;

transforming, by said computing device, the source code region based upon the most suitable intermediate form and associated map;

generating, by said computing device, from the transformed source code region a plurality of different intermediate forms corresponding to different compiler flag settings;

generating, by said computing device, a second map associated with each intermediate form, said second map representing regions within the associated intermediate form that are valid; and recording, by said computing device, said transformation and any transformations recorded in the map of said preceding iteration.

9. A computer program product comprising:

a storage medium readable by a computer system and tangibly embodying recording software instructions organized as separate software components executable in combination by a computer system, said software instructions being configured to perform a method for iteratively interpreting a single source code region written in one computer programming language as another computer programming language, the method comprising an initial iteration comprising:

generating from said single source code region a plurality of different intermediate forms each corresponding to a different computer programming language; and generating a map associated with each of said plurality of different intermediate forms, said map representing regions within the associated intermediate form that are valid.

10. The method as claimed in claim 9, further comprising a further iteration comprising:

analyzing, by said computing device, the intermediate forms and associated maps generated in a preceding iteration to identify a most suitable intermediate form for said source code region;

transforming, by said computing device, the source code region based upon the most suitable intermediate form and associated map;

generating, by said computing device, from the transformed source code region a plurality of different intermediate forms corresponding to different compiler flag settings;

generating, by said computing device, a second map associated with each intermediate form, said second map representing regions within the associated intermediate form that are valid; and recording, by said computing device, said transformation and any transformations recorded in the map of said preceding iteration.

11. A computer system comprising:

a processor for executing software instructions;

a memory for storing software instructions;

a system bus coupling the memory and the processor; and a computer program product comprising:

a storage medium readable by a computer system and recording software instructions organized as separate software components executable in combination by a computer system, said software instructions being configured to perform a method for iteratively interpreting a single source code region written in one computer programming language as another computer programming language, the method comprising an initial iteration comprising:
- generating from said single source code region a plurality of different intermediate forms each corresponding to a different computer programming language; and
- generating a map associated with each of said plurality of different intermediate forms, said map representing regions within the associated intermediate form that are valid.

12. The method as claimed in claim 11, further comprising a further iteration comprising:
- analyzing, by said computing device, the intermediate forms and associated maps generated in a preceding iteration to identify a most suitable intermediate form for said source code region;
- transforming, by said computing device, the source code region based upon the most suitable intermediate form and associated map;
- generating, by said computing device, from the transformed source code region a plurality of different intermediate forms corresponding to different compiler flag settings;
- generating, by said computing device, a second map associated with each intermediate form, said second map representing regions within the associated intermediate form that are valid; and
- recording, by said computing device, said transformation and any transformations recorded in the map of said preceding iteration.

13. A computer-assisted method for iteratively interpreting a single source code region written in one computer programming language as another computer programming language, the method comprising an initial iteration comprising:
- generating from said single source code region a plurality of different intermediate forms each corresponding to a different computer programming language;
- generating a map associated with each of said plurality of different intermediate forms, said map representing regions within the associated intermediate form that are valid;
- analyzing the intermediate forms and associated maps to identify a most suitable intermediate form for said source code region; and
- transforming the source code region based upon the most suitable intermediate form and associated map.

14. The method as claimed in claim 13, further comprising a further iteration comprising:
- analyzing, by said computing device, the intermediate forms and associated maps generated in a preceding iteration to identify a most suitable intermediate form for said source code region;
- transforming, by said computing device, the source code region based upon the most suitable intermediate form and associated map;
- generating, by said computing device, from the transformed source code region a plurality of different intermediate forms corresponding to different compiler flag settings;
- generating, by said computing device, a second map associated with each intermediate form, said second map representing regions within the associated intermediate form that are valid; and
- recording, by said computing device, said transformation and any transformations recorded in the map of said preceding iteration.

* * * * *